United States Patent [19]
Fujiki

[11] Patent Number: 5,554,333
[45] Date of Patent: Sep. 10, 1996

[54] APPARATUS AND METHOD FOR PRODUCING FLOOR MAT CARRYING FLAT-TIPPED PROJECTIONS

[75] Inventor: Nobuo Fujiki, Shiga, Japan

[73] Assignee: Japan Vilene Company Ltd., Tokyo, Japan

[21] Appl. No.: 366,237

[22] Filed: Dec. 29, 1994

[30] Foreign Application Priority Data

Dec. 29, 1993 [JP] Japan .................... 5-350118

[51] Int. Cl.⁶ .................................. B29C 59/04
[52] U.S. Cl. .................. 264/284; 264/173.1; 425/327; 425/385; 425/812
[58] Field of Search ............. 264/284, DIG. 78, 264/166, 101, 555–6, 571, 173.1; 425/385, 326.1, 327, 325, 812, 388

[56] References Cited

U.S. PATENT DOCUMENTS

| | | | |
|---|---|---|---|
| 2,714,340 | 8/1955 | Brown | 264/101 |
| 3,256,376 | 6/1966 | Leedy et al. | 425/327 |
| 3,399,425 | 9/1968 | Lemelson | 425/327 |
| 3,551,544 | 12/1970 | Hlinka | 264/284 |
| 3,555,601 | 1/1971 | Price | 425/327 |
| 3,590,109 | 6/1971 | Doleman et al. | 264/216 |
| 3,682,760 | 8/1972 | Fairbanks | 425/326.1 |
| 3,709,647 | 1/1973 | Barnhart | 425/363 |
| 4,733,997 | 3/1988 | Ford et al. | 264/138 |
| 4,921,563 | 5/1990 | Schwertner et al. | 264/210.2 |
| 4,999,152 | 3/1991 | Baldwin et al. | 264/556 |

FOREIGN PATENT DOCUMENTS

63-202428  8/1988  Japan .................... 264/284

Primary Examiner—Jeffery R. Thurlow
Attorney, Agent, or Firm—Sughrue, Mion, Zinn, Macpeak & Seas

[57] ABSTRACT

An apparatus and a method for producing a floor mat carrying a group of projections with a predetermined shape on a reverse surface to be contacted with a floor, by passing a molding resin material through a nip between a press roll and a mold roll are disclosed. The apparatus comprises the mold roll containing a hollow drum having through holes for a mold and contacting the press roll; an air venting means provided inside the hollow drum; and a sealing means for the molding resin material; each of the through holes having an insertion opening having a shape corresponding to a sectional shape of a predetermined base shape of the projections, a wall portion having a shape corresponding to a predetermined side shape of the projections, and an air venting opening having a shape corresponding to a predetermined flat tip area shape of the projections; and at least until the through hole is completely filled with the molding resin material, the air venting opening of the through hole communicating with the air venting means, and when at least the through hole is completely filled with the molding resin material, the air venting opening of the through hole being sealed with the sealing means.

8 Claims, 4 Drawing Sheets

Fig. 1

Prior Art

Fig. 2

Prior Art

Fig. 3

Prior Art

APPARATUS AND METHOD FOR PRODUCING FLOOR MAT CARRYING FLAT-TIPPED PROJECTIONS

BACKGROUND OF THE INVENTION

1. Field of the Invention

The present invention relates to an apparatus and method for producing a floor mat provided on its reverse side with a group of projections having flat areas on their tips so as to improve the effect of prevention of sliding or shifting of position. The floor mat obtained by the apparatus and method of the present invention is useful, for example, as a floor mat for a car or a floor mat for the home or office.

2. Description of the Related Art

Figure 1:
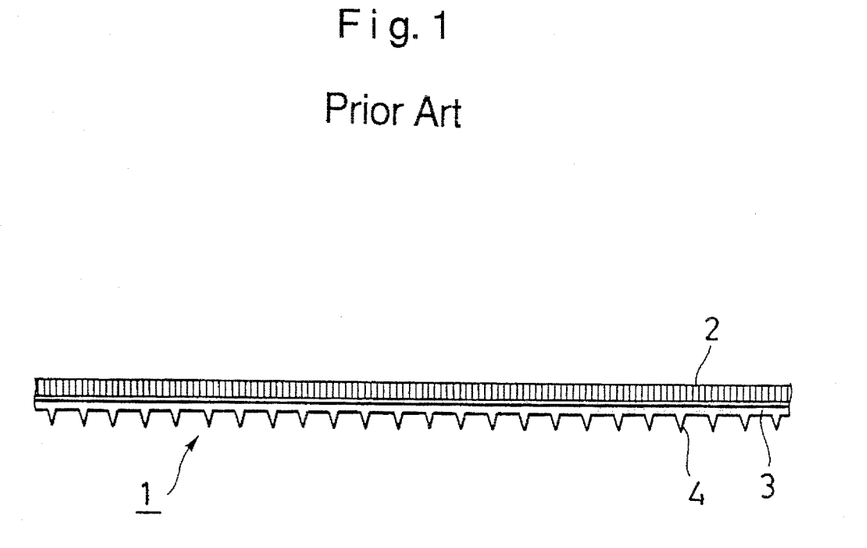
FIG. 1 is side view of a conventional floor mat for a car.

Hitherto, a group of projections was provided on the reverse surface of the mat so as to prevent the slide of a car floor mat, a door mat or the like. For example, as shown in FIG. 1, a conventional car floor mat 1 may be composed of a surfacing sheet 2 comprising a carpet or the like, a substrate sheet 3 comprising an elastic soft material (for example, a thermoplastic resin), and projections 4 on the reverse surface of the substrate sheet 3. In the case of a car floor mat composed of only an elastic soft material or the like without a surfacing sheet, a similar group of projections was provided on the reverse surface. The frictional resistance between the tips of the group of projections and the floor surface can prevent movement or sliding. The shape of the projections is generally preferably a frustum with a smooth flat area at the tip.

Figure 2:
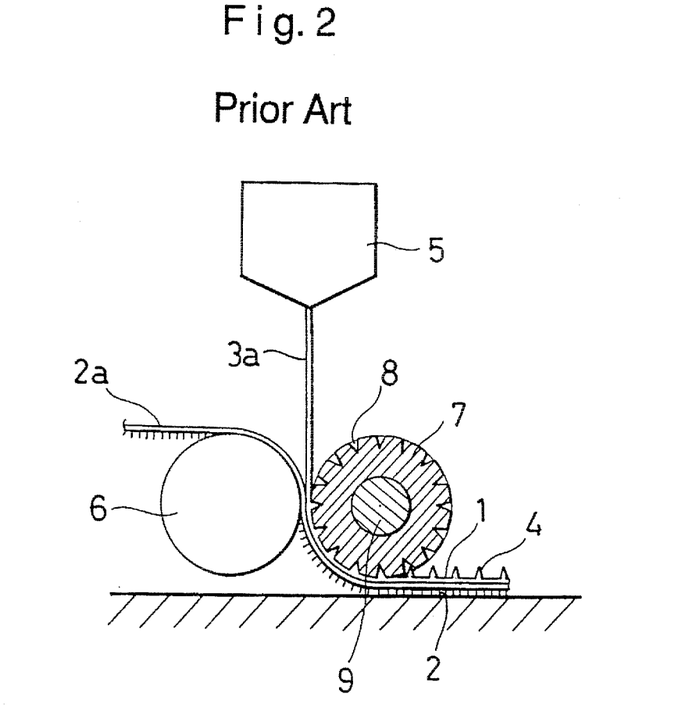
FIG. 2 is a cross-sectional view schematically showing a part of an apparatus for producing a conventional floor mat.

When producing a mat having such projections, a pair of rolls as shown in FIG. 2 was generally used. That is, a molding resin material 3a supplied from a resin supply means 5 was passed through the nip between a press roll 6 and a mold roll 7 contacting each other in parallel, and was laminated with a surfacing sheet material 2a supplied from the press roll 6 side. On the surface of the mold roll 7, depressions 8 corresponding to the molds of the projections 4 were formed. Thus, the heated and softened molding resin material 3a was pushed into these depressions 8. Because the mold roll 7 had a cooling means 9, the molding resin material 3a in the depressions 8 was gradually cooled and formed, and then pulled out from the depressions 8 along with the rotation of the press roll 6 and the mold roll 7 to form a floor mat having projections 4 on the reverse surface.

Figure 3:
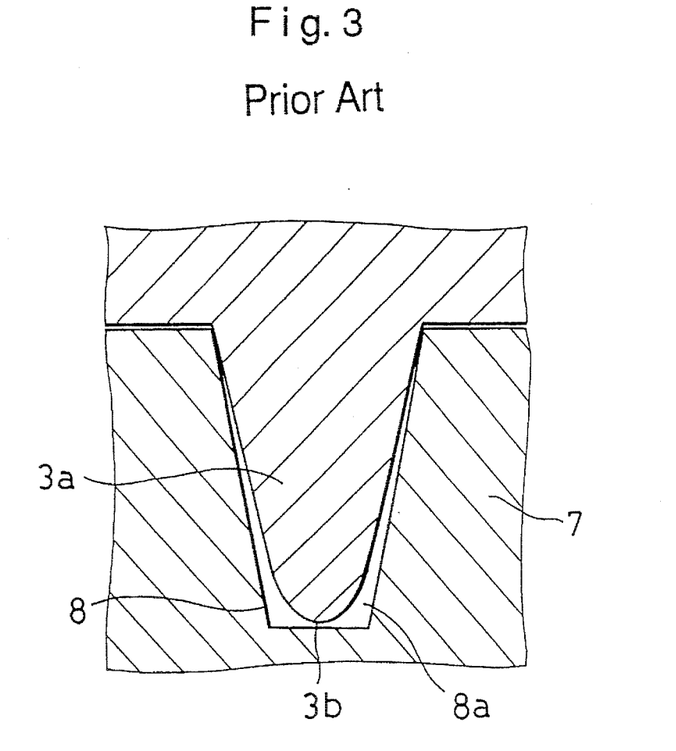
FIG. 3 is a partial cross-sectional view showing a depression in a conventional mold roll and the shape of a projection formed thereby.

In the conventional mold roll 7, however, no means was provided for venting the air in the depressions 8 of the molds. Therefore, as shown in FIG. 3, when the heated and softened molding resin material 3a was pushed into the depressions 8, air was compressed at the innermost parts of the depressions 8, and thus spaces 8a were formed. Accordingly, even if the bottom surfaces of the depressions 8 as the molds were flat, the form of the tips 3b of the projections did not become flat, but spherical.

As above, in the conventional method for production of a floor mat, it was not possible to form projections having a shape exactly corresponding to the shape of the depressions 8 of the molds. Strictly speaking, the shapes of the projections were diverse. Further, it was substantially impossible or extremely difficult to stably form a group of projections having flat surfaces on their tips. In addition, a floor mat having a group of projections with spherical tips did not give rise to a sufficient frictional resistance and was not satisfactory in terms of the effect of preventing sliding or shifting of position.

SUMMARY OF THE INVENTION

Accordingly, an object of the present invention is to provide an apparatus and a method for producing a floor mat carrying a group of projections having shapes exactly corresponding to a predetermined shape of a mold and at the same time having flat surfaces on their tips.

Other objects and advantages of the present invention will be apparent from the following description.

The present invention relates to an apparatus for producing a floor mat carrying a group of projections with a predetermined shape on a reverse surface to be contacted with a floor, by passing a molding resin material supplied from a resin supply means through a nip between a press roll and a mold roll contacting each other in parallel, wherein the mold roll contains a hollow drum having through holes for a mold and contacting the press roll;

an air venting means provided inside the hollow drum; and a sealing means for the molding resin material;

each of the through holes provided in the hollow drum has an insertion opening of the molding resin material, having a shape corresponding to a sectional shape of a predetermined base shape of the projections, a wall portion having a shape corresponding to a predetermined side shape of the projections, and an air venting opening having a shape corresponding to a predetermined flat tip area shape of the projections; and at least until the through hole is completely filled with the molding resin material, the air venting opening of the through hole communicates with the air venting means, and when at least the through hole is completely filled with the molding resin material, the air venting opening of the through hole is sealed with the sealing means.

Further, the present invention also relates to a method for producing a floor mat carrying a group of projections of a predetermined shape on a reverse surface to be contacted with a floor, by passing a molding resin material supplied from a resin supply means through a nip between a press roll and a mold roll contacting each other in parallel, comprising the steps of:

supplying a heated molding resin material to a nip between the press roll and the mold roll containing a hollow drum having through holes for a mold and contacting the press roll, an air venting means provided inside the hollow drum and a sealing means for the molding resin material;

filling the through holes provided in the hollow drum, with the molding resin material supplied by rotation of the press roll and the mold roll from an insertion opening of the through hole for the molding resin material, each through hole having the insertion opening having a shape corresponding to the sectional shape of a predetermined base shape of the projections, a wall portion having a shape corresponding to a predetermined side shape of the projections, and an air venting opening having a shape corresponding to a predetermined flat tip area shape of the projections;

pushing an air out of the through holes from the air venting opening to the air venting means, along with insertion of the molding resin material, sealing the air venting opening with a sealing means when the through hole is completely filled with the molding resin material;

cooling the molding resin material in the through holes; and withdrawing the cooled resin material from the through holes by rotation of the press roll and the mold roll.

DESCRIPTION OF THE PREFERRED EMBODIMENTS

The present invention will be explained in further detail hereinafter with reference to the attached drawings.

Figure 4:
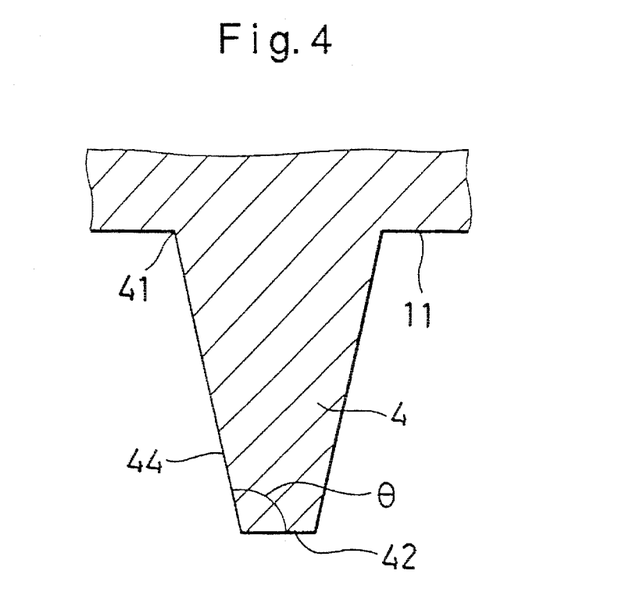
FIG. 4 is a cross-sectional view of a projection formed on the reverse surface of a floor mat obtained according to a first embodiment of the present invention.

The floor mat produced by the apparatus or method of the present invention carries a group of projections on the reverse surface to be contacted with a floor. Substantially all of the projections have substantially smooth flat areas of a predetermined shape on their tips. The shape of the projections is not particularly limited so long as the projections have smooth flat areas on their tips. For example, as shown in FIG. 4, the projections may be of a shape where the sectional areas of the projection 4 continuously cut in parallel with the reverse surface 11 of the floor mat becomes gradually smaller in the direction toward the tip 42 from the base 41 of the projection 4.

The production apparatus according to the present invention, as the conventional production apparatus shown in FIG. 2, has a structure so that the molding resin material (and optionally the surfacing sheet and the like) is passed through a nip between the press roll and the mold roll which are contacted to each other in parallel. However, the structure of the mold roll in the apparatus of the present invention is different from that of the mold roll in the conventional apparatus.

Figure 5:
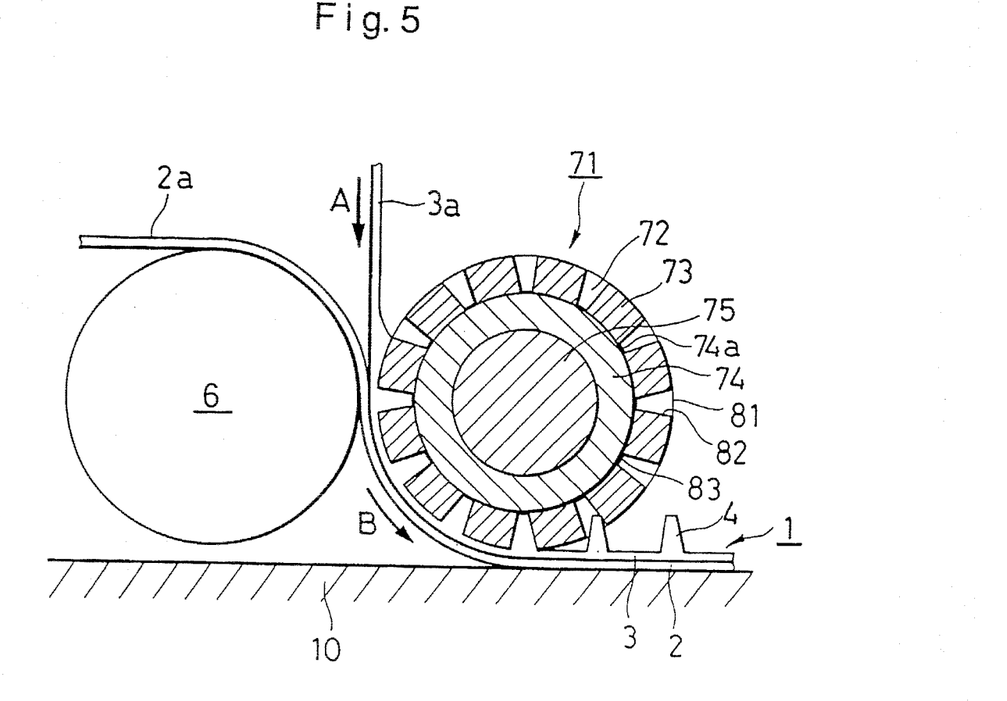
FIG. 5 is a cross-sectional view of a mold roll which may be used in the apparatus of the present invention together with a press roll and a molded material.

A first embodiment of the mold roll which may be used in the apparatus of the present invention is shown in FIG. 5.

The mold roll 71 is an integral type which is composed of a hollow drum 73 having through holes 72 for a mold, a porous layer 74 provided in the hollow drum 73, and a core roll 75 disposed at the center of the hollow drum 73. The inside portion of the hollow drum 73 of the integral type mold roll may also be composed only of the porous core. The hollow drum 73 contacts the press roll 6 at the outside. The press roll 6 may be those used in the conventional production apparatus. Usually, the press roll 6 has a smooth surface. Further, a cooling means (not shown) used in conventional mold rolls is provided at the porous layer 74 and/or preferably the core roll 75 in the mold roll 71. The cooling means may be, for example, either an air-cooling type or water-cooling type.

Each of the plural through holes 72 provided in the hollow drum 73 comprises an insertion opening 81 for the molding resin material, which opening has a shape corresponding to the sectional shape of the base 41 of a predetermined shape of the projections; a wall portion 82 having a shape corresponding to a predetermined shape of a side 44 of the projections; and an air venting opening 83 having a shape corresponding to the shape of the flat tip area 42 of the projections. The porous layer 74 is provided in the hollow drum 73 while contacting the inside surface of the hollow drum 73, and thus, the air venting openings 83 are sealed with the surface of the porous layer 74. So long as at least the air venting openings 83 are sealed with the surface of the porous layer 74, the rest of the surface of the porous layer 74 does not need to contact the inside surface of the hollow drum 73. Further, the surface region 74a on the porous layer 74 sealing the air venting openings 83 forms the molds corresponding to the predetermined shape of the projections, together with the insertion openings 81 and the wall portions 82. Therefore, the surface regions 74a must have a shape corresponding to the predetermined shape of the flat tip areas of the projections. The same shape or plural kinds of shapes of the through holes 72 may be provided on the hollow drum 73.

The hollow drum 73 and the porous layer 74 are brought into contact with the hot molding resin material, and so are composed of a heat resistant material. The hollow drum 73 may be prepared from, for example, a pipe made by welding a stainless steel into a cylinder, or preferably a seamless pipe such as an extruded steel pipe, as in the conventional mold roll. Further, the porous layer 74 is preferably prepared from a heat resistant porous material, for example, a sintered metal, metal nonwoven fabric, or sintered ceramics. The two ends of the hollow drum 73 may be open or may be closed. The porous layer 74 may also be connected to a vacuum apparatus. In the particular case that the two ends of the hollow drum 73 are closed, it is preferable to connect the porous layer 74 to a vacuum apparatus.

When the mold roll 71 shown in FIG. 5 is used to produce the floor mat in accordance with the present invention, the heated and softened molding resin material 3a is supplied from the resin supply means (not shown) in the direction of the arrow A to the nip between the press roll 6 and the mold roll 71 which contact each other in parallel. In such a manner, it is possible to produce a floor mat having various layer structures in accordance with the present invention. For example, a car floor mat is generally prepared from an elastic soft material to form a sheet mat (hereinafter sometimes referred to as an elastomeric mat), or from an elastic soft material sheet as a substrate and a surfacing material such as a carpet thereon to form a laminated mat (hereinafter sometimes referred to as a laminated mat). When a laminated mat is produced, a surfacing sheet such as a carpet 2a is supplied from the press roll 6 side. Further, when an elastomeric mat is produced, it is not necessary to supply a sheet material from the press roll 6 side. Still further, when a floor mat containing one or more intermediate layers between the surfacing material and the substrate is produced, the sheet materials for the intermediate layers may be supplied together with the surfacing sheet 2a from the press roll 6 side.

The heated and softened molding resin material supplied to the nip between the press roll 6 and the mold roll 71 is gradually pushed into the through holes 72 from the insertion openings 81. When the molding resin material is pushed in the through holes 72, the air in the holes is pushed out from the air venting openings 83 to the porous layer 74. Therefore, the porous layer 74 acts as the air venting means. The insertion of the molding resin material into the through holes 72 is finally stopped when the molding resin material reaches the surface regions 74a which seals the air venting openings 83. Therefore, the porous layer 74 acts as a means for sealing the molding resin material as well. The surface regions 74a sealing the air venting openings 83, the insertion openings 81, and the wall portions 82 form the mold for the projection. Therefore, all the air which has been present in such molds is discharged into the surface regions 74a of the porous layer 74, and thus the insides of the molds are completely filled with the molding resin material. Accordingly, the molding resin material is formed precisely in the desired predetermined shapes of the projections.

The projections thus formed are gradually moved in the direction of the arrow B by the rotation of the press roll 6 and the mold roll 71 and the guide plate 10 while being cooled by a cooling means (not shown) in the mold roll 71. The molded projections are withdrawn from the through holes 72. In this case, the projections may be cooled to an extent that the formed shape can be maintained, but not be cooled to an extent that the formed shape cannot be withdrawn from the molds. Therefore, the projections can be smoothly withdrawn without destroying the shapes, even when the projections having a large portion at the tip end is produced.

Figure 6:
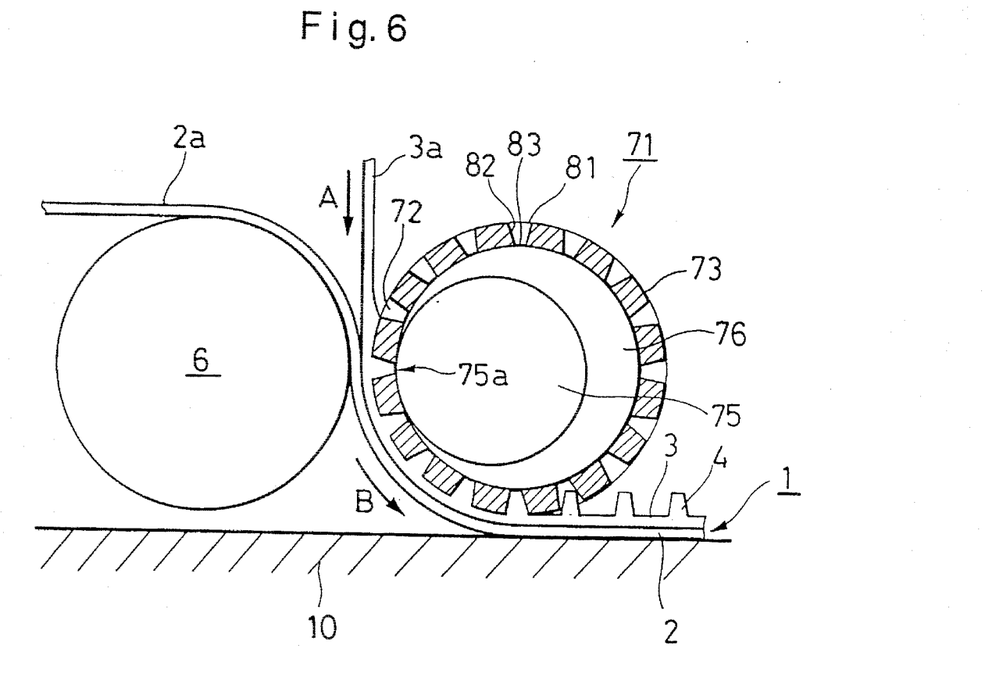
FIG. 6 is a cross-sectional view of a mold roll which may be used in another embodiment of the apparatus of the present invention together with the press roll.

A second embodiment of the mold roll which may be used in the apparatus of the present invention is shown in FIG. 6.

The mold roll 71 comprises a hollow drum 73 having the through holes 72, and a core roll 75 having an outer diameter smaller than the inner diameter of the hollow drum 73. The core roll 75 contacts the inside of the hollow drum 73 at a position where the hollow drum 73 contacts the press roll 6. That is, the hollow drum 73 and the core roll 75 are rotatable, but the rotation centers of the hollow drum 73 and the core roll 75 are different from each other. Therefore, a space 76 is formed between the inside surface of the hollow drum 73 and the outside surface of the core roll 75.

The press roll 6 used in a conventional apparatus and usually having a smooth surface may be used in the second embodiment of the present invention. Further, a cooling means (not shown) used in conventional mold rolls is provided in the mold roll 71, particularly in the core roll 75. The cooling means may be, for example, either the air-cooling type or water-cooling type.

Each of the plural through holes 72 provided in the hollow drum 73 comprises an insertion opening 81 for the molding resin material, which opening has a shape corresponding to the sectional shape of the base 41 of a predetermined shape of the projections; a wall portion 82 having a shape corresponding to a predetermined shape of a side 44 of the projections; and an air venting opening 83 having a shape corresponding to the shape of the flat tip area 42 of the projections. The inside surface of the hollow drum 73 contacts the surface of the core roll 75 or contacts a space 76 formed with the core roll 75. When the hollow drum 73 contacts the inside of the core roll 75, the surface region 75a of the core roll 75 seals the air venting opening 83 to form a mold having a shape corresponding to the predetermined shape of the projections together with the insertion opening 81 and the wall portion 82. Therefore, the surface region 75a must have a shape corresponding to the predetermined shape of the flat tip area of the projections. The same shape or plural kinds of shapes of the through holes 72 may be provided on the hollow drum 73.

The hollow drum 73 and the core roll 75 are brought into contact with the hot molding resin material, and so are composed of a heat resistant material. The hollow drum 73 and the core roll 75 may be prepared from, for example, a pipe made by welding a stainless steel into a cylinder, or preferably a seamless pipe such as an extruded steel pipe, as in the conventional mold roll. The two ends of the hollow drum 73 may be open or closed. In the particular case that the two ends of the hollow drum 73 are closed, it is preferable to connect the space 76 to a vacuum apparatus.

When the mold roll 71 shown in FIG. 6 is used to produce the floor mat in accordance with the present invention, the heated and softened molding resin material 3a is supplied from the resin supply means (not shown) in the direction of the arrow A to the nip between the press roll 6 and the mold roll 71 which contact each other in parallel. When a laminated mat is produced, a surfacing sheet such as a carpet 2a is supplied from the press roll 6 side. Further, when an elastomeric mat is produced, it is not necessary to supply a sheet material from the press roll 6 side. Still further, when a floor mat containing one or more intermediate layers between the surfacing material and the substrate is produced, the sheet materials for the intermediate layers may be supplied together with the surfacing sheet 2a from the press roll 6 side.

The heated and softened molding resin material supplied to the nip between the press roll 6 and the mold roll 71 is gradually pushed into the through holes 72 from the insertion openings 81. When the molding resin material is pushed in the through holes 72, the air in the holes is pushed out from the air venting openings 83 to the space 76. Therefore, the space 76 acts as the air venting means. Around the time when the molding resin material pushed into the through hole 72 reaches the portion near the air venting opening 83, the core roll 75 starts to contact the inside surface of the hollow drum 73. When the through hole 72 is completely filled with the molding resin material, the air venting openings 83 is sealed with the core roll 75. Therefore, the core roll 75 acts as a means for sealing the molding resin material. The surface regions 75a sealing the air venting openings 83, the insertion openings 81, and the wall portions 82 form the mold for the projection. Therefore, all the air which has been present in such molds is discharged into the space 76, and thus the insides of the molds are completely filled with the molding resin material. Accordingly, the molding resin material is formed precisely in the desired predetermined shapes of the projections.

The projections thus formed are gradually moved in the direction of the arrow B by the rotation of the press roll 6 and the mold roll 71 and the guide plate 10 while being cooled by a cooling means (not shown) in the mold roll 71. The molded projections are withdrawn from the through holes 72. In this case, the projections may be cooled to an extent that the formed shape can be maintained, but not be cooled to an extent that the formed shape cannot be withdrawn from the molds. Therefore, the projections can be smoothly withdrawn without destroying the shapes, even when the projections having a large portion at the tip end is produced.

The size of each component contained in the mold roll 71 is not particularly limited in the present invention. As a matter of fact, the thickness of the hollow drum 73 and the size of the through holes 72 are determined in accordance with the desired shape of the projection. Accordingly, the thickness of the hollow drum 73 corresponds to the height of the projection and is usually 3 to 10 mm. The diameter of the hollow drum 73 is also not particularly limited and may be similar to that of the conventional mold roll.

Figure 7:
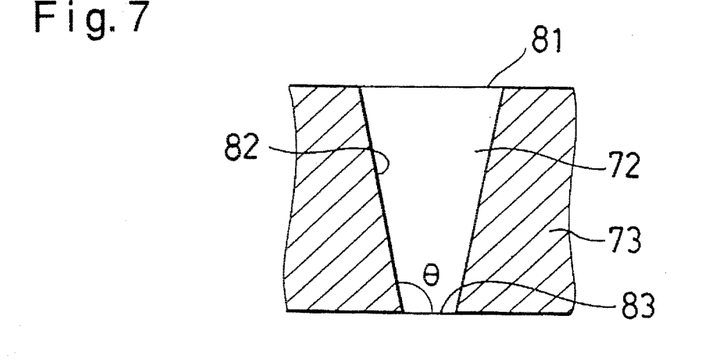
FIG. 7 is a cross-sectional view of a through hole provided in the hollow drum of the apparatus of the present invention.

According to the present invention, it is possible to provide the through holes 72 having a shape corresponding to any desired shape of projections and form a group of projections having any desired shape. For example, the through hole 72 as shown in FIG. 7 may be used to form the frustum projection as shown in FIG. 4. In this case, the sectional area of the insertion opening 81 corresponding to the base 41 is not particularly limited, but may usually be 4 to 50 mm$^2$. The sectional area of the air venting opening 83 corresponding to the flat tip area 42 is not particularly limited, but may usually be 0.2 to 20 mm$^2$. The ratio of the sectional area of the air venting opening 83 to that of the insertion opening 81 is not particularly limited, but may usually be 1 to 5. Further, the ratio of the height to the diameter of the sectional circle of the insertion opening 81 is not particularly limited, but may usually be 1 to 5.

Further, the projections may be of a shape where the sectional areas of the projection 4 continuously cut in parallel with the reverse surface 11 of the floor mat becomes gradually larger in the direction toward the tip 42 from the base 41 of the projection 4; or of a shape where the sectional areas of the projection 4 continuously cut in parallel with the reverse surface 11 of the floor mat are not substantially changed from the base 41 to the tip 42 of the projection 4. In these cases, the sizes are not particularly limited, but may be same as those explained with reference to the frustum projection as shown in FIG. 4.

Figure 8:
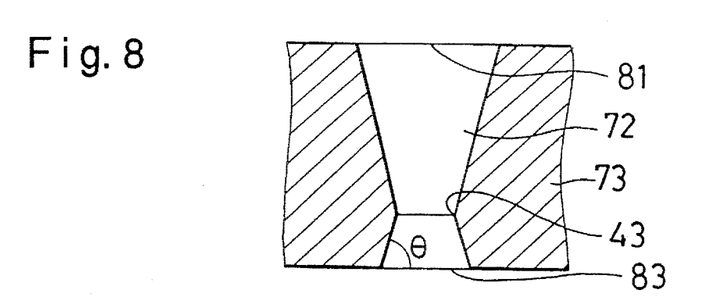
FIG. 8 is a cross-sectional view of another through hole provided in the hollow drum of the apparatus of the present invention.

Still further, the projections may be constricted in the middle, i.e., of a shape where the sectional areas of the projection 4 continuously cut in parallel with the reverse surface 11 of the floor mat becomes smallest at a certain site (hereinafter referred to as waist) between the base 41 and tip 42 of the projection 4, gradually smaller in the direction toward the waist from the base 41 of the projection 4, and gradually larger in the direction toward the tip 42 from the waist of the projection 4. In this case, it is possible to use the through hole 72 shown as in FIG. 8. The sizes of the portions in this case are not particularly limited so long as they are about the same as those explained with reference to the frustum projection as shown in FIG. 4. Further, the position of the waist (the portion 43 with smallest inner diameter) is not particularly limited.

Further, the projections may be of a shape where the sectional areas of the projection 4 continuously cut in parallel with the reverse surface 11 of the floor mat becomes smallest at the waist between the base 41 and tip 42 of the projection 4, gradually smaller in the direction toward the waist 43 from the base 41 of the projection 4, and are not substantially changed from the waist to the tip 42. Furthermore, the projections may be of a shape where the sectional areas of the projection 4 continuously cut in parallel with the reverse surface 11 of the floor mat becomes largest at the waist between the base 41 and tip 42 of the projection 4, gradually larger in the direction toward the waist 43 from the base 41 of the projection 4, and are not substantially changed from the waist 43 to the tip 42. The sizes of the portions in these cases are not particularly limited so long as they are about the same as above.

Figure 9:
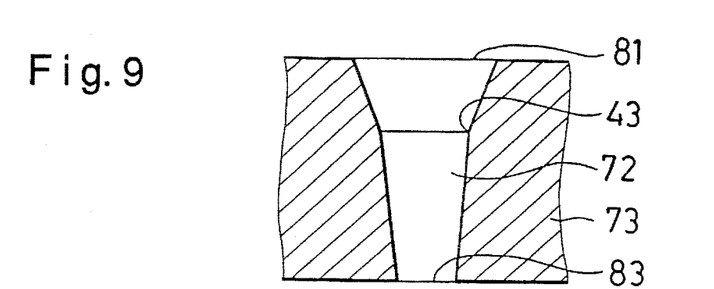
FIG. 9 is a cross-sectional view of still another through hole provided in the hollow drum of the apparatus of the present invention.

Further, the projections may be of a shape where the sectional areas of the projection 4 continuously cut in parallel with the reverse surface 11 of the floor mat becomes gradually smaller in the direction toward the waist 43 from the base 41 of the projection 4, and further gradually smaller in the direction toward the tip 42 from the waist 43 in a different rate. In this case, the through hole 72 as shown in FIG. 9 may be used. The sizes of the portions in this case are not particularly limited so long as they are about the same as above. FIG. 9 illustrates the case of the inclination from the base 41 (insertion opening 81) to the waist (central portion 43) being larger than the inclination from the waist (central portion 43) to the tip 42 (air venting opening 83). It is also possible to use the through hole wherein the inclination from the base 41 to the waist is smaller than the inclination from the waist to the tip 42.

Figure 10:
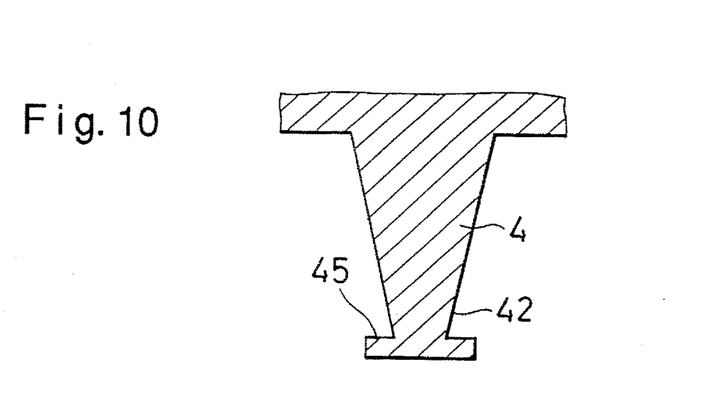
FIG. 10 is a cross-sectional view of a projection formed at the reverse surface of the floor mat obtained according to another embodiment of the present invention.

Still further, as shown in FIG. 10, it is possible to provide a disk-shaped tip piece 45 at the tip 42 of the projection 4. The size of the disk-shaped tip piece 45 is also not particularly limited, but may be about the same as or about 10 to 20 percent larger than those explained as above. The disk-shaped tip piece 45 may be carried on one of any projections having a shape as mentioned above. When the projections 4 carrying the disk-shaped tip piece 45 are produced, it is possible to use the through holes 72 having a corresponding shape, or adjust the distance between the hollow drum 73 and the inside core roll 75 at the position where the press roll 6 and the hollow drum 73 come into contact in the apparatus wherein the mold roll 71 as shown in FIG. 6 is used.

The angle theta ($\theta$) (see FIGS. 7 and 8) between the plane of the flat tip area 42 and the side face 44 of the projection is not particularly limited, but for example may be 75° to 135°. Further, the density of the projections on the reverse surface 11 of the floor mat is not particularly limited, but may for example be 0.1 to 9 projections/cm$^2$, more preferably 0.25 to 5 projections/cm$^2$. The density of the projections depends upon the material of the floor with which the floor mat comes into contact. For example, in the case of a floor composed of a carpet with a pile height of more than 7 mm, it is preferable that the density is relatively low (0.3 to 2 projections/cm$^2$) and the height of the projections is approximately same as the length of the piles. Further, in the case of a floor composed of a carpet with a pile height of less than 5 mm or of a synthetic resin, it is preferable that the density of the projections is high (at least 2 projections/cm$^2$) and the height of the projections is low (less than 5 mm). The floor mat obtained in accordance with the present invention may carry on its reverse surface one or more types of projections of predetermined shapes (for example, the above different shapes).

The layer structure of the floor mat obtained according to the present invention is not particularly limited, so long as the mat carries a sheet layer of an elastic soft material on its reverse side. For example, a sheet mat (an elastomeric mat) prepared from an elastic soft material, and a laminated mat prepared from an elastic soft material sheet as a substrate and a surfacing material such as a carpet thereon are widely used as a car floor mat. The floor mat prepared in accordance with the present invention may be the elastomeric mat or laminated mat, or a floor mat containing one or more intermediate layers between the surfacing material and the substrate. Further, the floor mat according to the present invention may be a floor mats used in home or office (for example, door mats, bath mats, toilet mats).

The material for the reverse surface of the floor mat according to the present invention may be an elastic soft material used for a similar purpose in the conventional mat. For example, a soft and thin sheet made of soft polyvinyl chloride, polyethylene-vinyl acetate copolymer, a synthetic or natural rubber, or the like may be used. It is preferable to use an extrudable thermoplastic resin, such as soft polyvinyl chloride, because the mat can continuously and easily be produced.

In the apparatus of the present invention, one or preferably both of the press roll and mold roll are driven to rotate. Further, a temperature control station may be provided downstream of the press roll and mold roll to improve the dimensional stability of the molded sheet. Further, in the second embodiment (FIG. 6), it is very easy to replace the hollow drum 73. Therefore, it is possible to use various types of hollow drums 73 having various types of through holes 72 in accordance with the specific applications.

As above, the apparatus of the present invention has a means for venting the air in the molds of the projections, and so can form the projections having a shape precisely same as the predetermined shape. Therefore, it is possible to product a floor mat having projections with smooth flat areas at their tips. The resulting floor mat has an extremely good effect in preventing sliding or shifting of position.

Although the present invention has been described with reference to specific embodiments, various changes and modifications obvious to those skilled in the art are deemed to be within the spirit, scope, and concept of the invention.

I claim:

1. An apparatus for producing a floor mat carrying a group of projections with a predetermined shape on a reverse surface to be contacted with a floor, by passing a molding resin material supplied from a resin supply means through a nip between a press roll and a mold roll contacting each other in parallel, wherein the mold roll contains a hollow drum having through holes for a mold and contacting the press roll;

an air venting means provided inside the hollow drum; and a sealing means for the molding resin material;

each of the through holes provided in the hollow drum has an insertion opening of the molding resin material, having a shape corresponding to a sectional shape of a predetermined base shape of the projections, a wall portion having a shape corresponding to a predetermined side shape of the projections, and an air venting opening having a shape corresponding to a predetermined flat tip area shape of the projections; and at least until the through hole is completely filled with the molding resin material, the air venting opening of the through hole communicates with the air venting means, and when at least the through hole is completely filled with the molding resin material, the air venting opening of the through hole is sealed with the sealing means.

2. An apparatus according to claim 1, wherein a porous layer which is provided while contacting an inner surface of the hollow drum serves as the air venting means and the sealing means.

3. An apparatus according to claim 1, wherein the mold roll is an integral type roll comprising the hollow drum and the porous layer with which an inside of the hollow drum is filled.

4. An apparatus according to claim 1, wherein the mold roll is an integral type roll comprising the hollow drum, the porous layer contacting the inside surface of the hollow drum, and a core roll provided in the porous layer.

5. An apparatus according to claim 1, wherein the porous layer is made of a sintered metal, metal nonwoven fabric, or sintered ceramics.

6. An apparatus for producing a floor mat carrying a group of projections with a predetermined shape on a reverse surface to be contacted with a floor, by passing a molding resin material supplied from a resin supply means through a nip between a press roll and a mold roll contacting each other in parallel, wherein the mold roll contains a hollow drum having through holes for a mold and contacting the press roll;

an air venting means provided inside the hollow drum; and a sealing means for the molding resin material;

each of the through holes provided in the hollow drum has an insertion opening of the molding resin material having a shape corresponding to a sectional shape of a predetermined base shape of the projections, a wall portion having a shape corresponding to a predetermined side shape of the projections, and an air venting opening having a shape corresponding to a predetermined flat tip area shape of the projections; and at least until the through hole is completely filled with the molding resin material, the air venting opening of the through hole communicates with the air venting means, and when at least the through hole is completely filled with the molding resin material, the air venting opening of the through hole is sealed with the sealing means; and wherein the air venting means is a space formed between the inside surface of the hollow drum and the outside smooth surface of a core roll which has an outer diameter smaller than the inner diameter of the hollow drum, and contacts the inside of the hollow drum at a position where the hollow drum contacts the press roll.

7. An apparatus for producing a floor mat carrying a group of projections with a predetermined shape on a reverse surface to be contacted with a floor, by passing a molding resin material supplied from a resin supply means through a nip between a press roll and a mold roll contacting each other in parallel, wherein the mold roll contains a hollow drum having through holes for a mold and contacting the press roll;

an air venting means provided inside the hollow drum; and a sealing means for the molding resin material;

each of the through holes provided in the hollow drum has an insertion opening of the molding resin material having a shape corresponding to a sectional shape of a predetermined base shape of the projections, a wall portion having a shape corresponding to a predetermined side shape of the projections, and an air venting opening having a shape corresponding to a predetermined flat tip area shape of the projections; and at least until the through hole is completely filled with the molding resin material, the air venting opening of the through hole communicates with the air venting means, and when at least the through hole is completely filled with the molding resin material, the air venting opening of the through hole is sealed with the sealing means; and wherein the sealing means is the smooth surface of a core roll contacting the inside of the hollow drum.

8. A method for producing a floor mat carrying a group of projections of a predetermined shape on a reverse surface to be contacted with a floor, by passing a molding resin material supplied from a resin supply means through a nip between a press roll and a mold roll contacting each other in parallel, comprising the steps of:

supplying a heated molding resin material to a nip between the press roll and the mold roll containing a hollow drum having through holes for a mold and contacting the press roll, an air venting means provided inside the hollow drum and a sealing means for the molding resin material;

filling the through holes provided in the hollow drum, with the molding resin material supplied by rotation of the press roll and the mold roll from an insertion opening of the through hole for the molding resin material, each through hole having the insertion opening having a shape corresponding to the sectional shape of a predetermined base shape of the projections, a wall portion having a shape corresponding to a predetermined side shape of the projections, and an air venting opening having a shape corresponding to a predetermined flat tip area shape of the projections;

pushing an air out of the through holes from the air venting opening to the air venting means, along with insertion of the molding resin material, sealing the air venting opening with a sealing means when the through hole is completely filled with the molding resin material;

cooling the molding resin material in the through holes; and withdrawing the cooled resin material from the through holes by rotation of the press roll and the mold roll.

* * * * *